INVENTOR.
WALTER K. MOEN
BY
ATTORNEY

či
3,554,816
HIGH TEMPERATURE THERMOCOUPLE CONTAINING CONDUCTORS COMPOSITIONALLY DISSIMILAR
Walter K. Moen, Whittier, Calif., assignor to North American Rockwell Corporation, a corporation of Delaware
Filed Aug. 23, 1967, Ser. No. 662,762
Int. Cl. H01v 1/04
U.S. Cl. 136—233
10 Claims

ABSTRACT OF THE DISCLOSURE

A tantalum sheathed thermocouple with tungsten-rhenium wires and beryllium oxide insulation is employed for temperature measurement in ablative materials. The elements of the thermocouple are made relatively small in a narrow range to achieve an erosion rate of the sheath and insulation substantially the same as the ablative erosion rate and less than the erosion rate of the wires. A chemical etching step is employed for reducing sheath diameter during manufacture of the thermocouple to obtain the small size. Unexpectedly it is found that the thermocouple wires reweld at the temperature of the lowest melting leg as the hot junction is eroded away during exposure of the ablative to a high temperature environment. The rewelding at a well known temperature provides a means for calibrating the thermocouple during use and also affords the opportunity to measure cooling temperatures after the thermocouple has been exposed to temperatures exceeding its melting point.

BACKGROUND

The invention described herein was made in the performance of work under a NASA contract and is subject to the provisions of the National Aeronautics and Space Act of 1958, Public Law 85–568 (72 Stat. 426; 42 U.S.C. 2451) as amended.

A significant portion of a space mission in terms of safety is re-entry of the space vehicle into the earth's atmosphere during which time the velocity of the vehicle is attenuated by atmospheric friction and the resultant energy is dissipated in the form of heat. The extremely high temperature and aerodynamic shear generated on the surface of the vehicle may be dissipated by use of ablative materials which char, melt, sublime, or otherwise decompose and erode to absorb energy and remove high temperature material from the surface. Many such ablative materials are well known in the art for providing heat shields for space vehicles.

It is important in development and testing of ablative heat shield materials, and also during actual space flights for control purposes, to measure the temperature of the heat shield during re-entry heating. Such temperature measurements are made at successive depths from the ablative surface for providing a time-temperature history of the ablative material and following the course of ablation thereof. For such measurements it is desirable to have highly reliable thermocouples of relatively small size for minimum disturbance of heating conditions and which are capable of providing accurate temperature measurements to extremely high temperatures and in very short times.

It is also desirable in employing a thermocouple to have an accurate calibration thereof so that the thermo-electric output is readily correlated with a known temperature. Precalibration of thermocouples at relatively lower temperatures has been employed in the past without any good means for verifying calibration during use of the thermocouple. In addition, in many instances it is desirable to measure cooling temperatures after a thermocouple has been heated in an environment that exceeds its melting point. Such measurements have not been available in the past.

BRIEF SUMMARY OF THE INVENTION

Thus, in the practice of this invention according to a preferred embodiment there is provided a high temperature thermocouple comprising a pair of compositionally dissimilar conductors electrically interconnected at one end to form a hot junction of the thermocouple. Spacing between the conductors is minimized to permit rewelding thereof after melting of the hot junction. A supporting structure is provided about conductors in the form of wires, the supporting structure having a faster erosion rate than the thermocouple wires for permitting rewelding of the wires after melting of the hot junction. Calibration of the thermocouple during use is provided by measuring the output thereof during melting and rewelding of the hot junction. A chemical etching step is employed for manufacturing a thermocouple having the desired characteristics.

Objects and many of the attendant advantages of this invention will be better appreciated as the same becomes better understood by reference to the following detailed description when considered in connection with the following drawings wherein.

Throughout the drawings like reference numerals refer to like parts.

Many ablative materials are employed for heat shields and they may be formed of complex mixtures of glass fibers, hollow glass microspheres, and the like, in a matrix of epoxy, phenolic, or silicone resins and their associated curing agents. In addition, flame retardent chemicals and materials with high heats of vaporization may also be included. A typical ablative material is described in U.S. Pat. 3,296,153.

Figure 1:
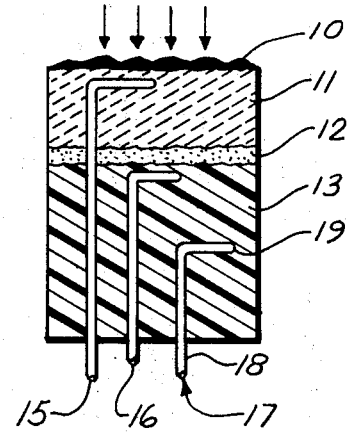
FIG. 1 illustrates an ablator with a plurality of thermocouples constructed according to the principles of this invention.

Although there are many such ablatives they all behave in the same general manner upon exposure to a high temperature environment. Upon reaching equilibrium ablation an ablative appears as illustrated in FIG. 1 wherein the surface 10 upon which heat is directed is at about 4,500 to 5,000° F. and comprises a mixture of eroding carbon and molten glass droplets. Inwardly, from the surface, for about one-quarter inch, is a fairly dense, carbonaceous char 11 formed by decomposition of the original ablative material. Inwardly from the char is a decomposition zone 12 which is typically about 0.040 inch thick and wherein the synthetic resins in the ablative material are decomposing and volitalizing because of the high temperature. Due to the chemical and physical reactions occurring a steep temperature gradient is encountered across the decomposition zone 12 and in a typical ablative material the temperature across this narrow zone may vary from about 600° F. to about 1600° F. on the inner and outer edges thereof respectively. Inwardly of the decomposition zone 12 is the virgin ablative material 13 which has not yet reached a temperature sufficient for substantial decomposition of the synthetic resins in the ablative material.

It is desirable in use of an ablative material to measure the temperature in the virgin material; in the decomposition zone; in the relatively thicker char layer; and at the heated surface. A thermocouple embedded in an ablative material is originally in virgin ablative 13, and as this material ablates the thermocouple is successively in the decomposition zone 12, char layer 11, and at the surface of the material 10. It is also desirable in an ablative to measure the temperature at a succession of points at increasing depths below the surface. For this reason a plurality of thermocouples 15, 16, and 17 are embedded in the ablative material at successive distances from the surface 10 upon which heating occurs. At any given instant of time during ablation one thermocouple 15 may be in the char region of the material; another thermocouple 16 may be measuring a temperature at the decomposition zone; and a third thermocouple 17 may be measuring the temperature of the virgin ablative material.

In order for a thermocouple to accurately measure the temperature of an ablative in the transient heat flow conditions of use it is desirable that the thermocouple have a time constant shorter than the time constant of the ablative material. It is found in practice that typical ablative materials have a time constant of about one second, that is, within about one second after exposure to a condition the temperature of the ablative material reaches 90% of the temperature it will ultimately reach. In such a material it is preferred that the time constant of the thermocouple be in the order of one-quarter second or less. The time constant of the thermocouple is dependent on the thermal conductivity of the materials of construction, thermal contact with the surroundings, the effective thermocouple junction area and its orientation relative to the heat flow, and the heat capacity of the thermocouple. In general, the smaller the thermocouple the shorter the time constant, however, extremely small thermocouples have diminished lifetimes.

In order to obtain good accuracy it is also desirable that the thermocouple leads to the hot junction are at substantially the same temperature as the hot junction for an appreciable length so that a minimum quantity of heat is conducted away from the junction by way of the leads. It is for this reason that a typical thermocouple 17 has a portion 18 extending through the ablative material in a direction normal to the surface 10 upon which heat impinges. This portion 18 need not extend exactly normal to the surface but can be at any arbitrary angle thereto and is maintained normal only for convenience of construction. The thermocouple 17 also has an end portion 19 lying parallel to the surface upon which heat impinges and ablation occurs. The parallel positioning of the hot junction end of the thermocouple with the surface so that a substantial portion of the thermocouple leads is heated at the same time as the hot junction, is a significant feature giving accurate temperature measurement.

In order to obtain measurements to elevated temperature it is significant that the wires forming the thermocouple remain in electrical contact to form a hot junction. When electrical contact between the wires is broken no output representative of temperature is obtained from the thermocouple. As has been mentioned, in order to obtain a short time constant in the thermocouple, it is desirable that the heat capacity be low. This means for a given material of construction that the mass and size are also low. It is found, however, that in thermocouples used with ablative materials subjected to very high heat fluxes that small thermocouples are subject to premature failure if the heat capacity is too low. It has been determined that for wire type thermocouples subjected to high heat fluxes a minimum wire diameter of about 0.005 inch is acceptable and wires appreciably smaller than this size are subject to premature failure in operation.

Figure 2:
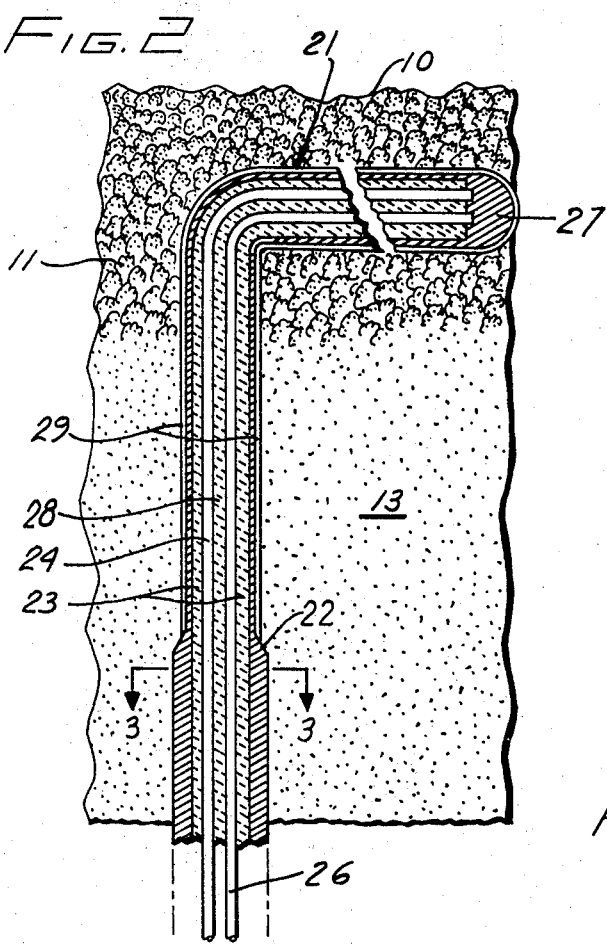
FIG. 2 illustrates one of the thermocouples of FIG. 1 in greater detail.
Figure 3:
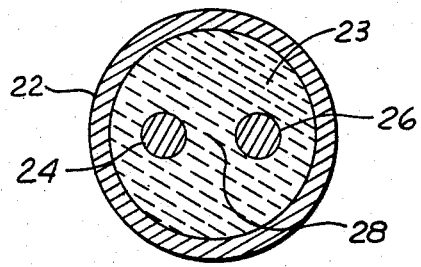
FIG. 3 is a cross-section of the thermocouple of FIG. 2.

With this in mind, a specific thermocouple constructed according to the principles of this invention is illustrated in FIG. 2. As illustrated therein a thermocouple is shown as being positioned embedded in an ablative material with a substantial portion in virgin material 13 and an end portion 21 in the char layer 11 of the ablative. As pointed out hereinabove, the end portion 21 lies parallel to the surface 10 of the ablative upon which heat impinges for minimum heat conduction from the hot junction. In a typical embodiment the thermocouple has a circular cross-section as illustrated in FIG. 3 and comprises a tantalum sheath 22 which is substantially filled with compacted beryllium oxide powder 23. Spaced within the beryllium oxide powder so as to be electrically insulated from the sheath 22 is a thermocouple wire 24 forming one leg of the thermocouple. This wire is preferably a tungsten-5% rhenium alloy for operation at elevated temperature. A second wire 26 of a tungsten-26% rhenium alloy is positioned in the beryllium oxide so as to be electrically insulated from the sheath 22 and the other thermocouple wire 24. These alloys are conventional materials for high temperature thermocouples and have a well known thermo-electric output as a function of temperature. The two thermocouple wires 24 and 26 are brought into electrical contact at one end thereof by a tantalum plug 27 (FIG. 2) at the end of the sheath 22. The electrical contact between the two wires and the tantalum plug forms the hot junction of the thermocouple.

In a typical embodiment the tantalum sheath 22 has an external diameter of about 0.040 inch and a nominal wall thickness of about 0.006 inch. The two thermocouple wires 24 and 26 each have a nominal diameter of about 0.005 inch and the web 28 of beryllium oxide powder between the two thermocouple wires has a thickness of about 0.004 inch. An appreciable portion of the thermocouple has a sheath with an external diameter of about 0.040 inch and a wall thickness of about 0.006 inch so that the assembled thermocouple has sufficient strength to be readily handled in practical application. In order to obtain a fast time constant, however, it is preferred to employ a sheath 22 having a thickness of only about 0.002 inch in the effective region thereof including the bent over portion 21. Therefore about 0.004 inch of material is removed from the exterior of the sheath by chemical etching as hereinafter described to leave a wall thickness of only 0.002 inch. If desired, a protective coating 29 of tungsten disilicide or other ceramic can be applied over the reduced section of the thermocouple sheath. Suitable coating materials include dip or spray coatings of sodium silicate suspensions of ceramic powder. Suitable ceramic powders include aluminum oxide, zirconium oxide, and oxides and silicates of the Group IV-B metals.

In use in ablative material a thermocouple as illustrated in FIG. 2 provides an electrical output corresponding to the temperature to which the hot junction is heated. It is found in practice that continuous output of a thermocouple as described and illustrated is provided up to temperatures in excess of 5,000° F. as the ablative material ablates. The continuous record provided by such a thermocouple during the high heat flux gives a good measure of the ablation characteristics and protective abilties of an ablative material.

Figure 4:
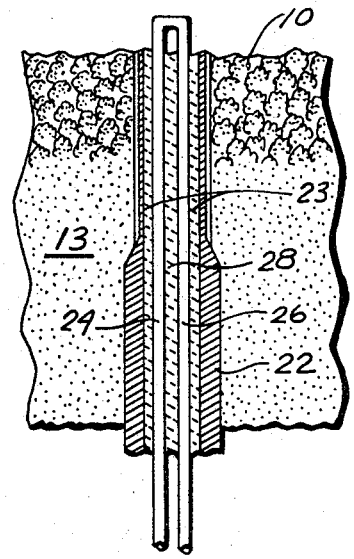
FIG. 4 illustrates the thermocouple of FIG. 2 after the ablating surface has moved along a portion of the length of the thermocouple.

When the ablating surface 10 erodes to the point where it reaches the thermocouple the sheath 22 is first exposed and is shortly thereafter melted and removed by the high heat and aerodynamic shear of re-entry conditions. The beryllium oxide powder, when no longer supported by the tantalum sheath, is also rapidly removed by the aerodynamic shear, leaving the thermocouple wires exposed. These wires remain because of their higher melting point until a temperature of about 5,648° F. is reached which is the melting temperature of the tungsten-26% rhenium alloy. As the thermocouple wires are melted and eroded away a condition as illustrated in FIG. 4 is reached wherein the end of the thermocouple extends normal to the surface 10 upon which heat impinges. In that condition the thin tantalum sheath 22 which has a thickness of only about 0.002 inch is melted and eroded away at substantially the same rate as the char layer 11 so that the end of the sheath is substantially flush with the surface 10. Lacking mechanical support from the sheath, the beryllium oxide powder 23 is also eroded away substantially flush with the surface 10. The wires 24 and 26 of tungsten-rhenium alloy have a melting point above the surface temperature and the ablation temperature so that they tend to protrude somewhat from the surface 10 into the gas stream. It is found with a moderate aerodynamic shear that the wires protrude above the surface 10 by about 0.020 to 0.030 inch.

Surprisingly, it is also observed that as the two wires are melted and eroded away a small mass of molten material remains to bridge the narrow gap between the two wires and provide electrical continuity and a hot junction. Thus, during operation of a thermocouple in the condition illustrated in FIG. 4 the hot junction is observed to protrude further and further from the surface 10 as this surface retreats due to ablation and eventually the hot junction melts and a portion is eroded away. The melting proceeds somewhat intermittently along the thermocouple and a new solid weld almost immediately recurs between the two wires after each melting. It would appear from records made during the progress of this melting and reforming that electrical contact between the two wires may never actually be broken for any substantial period of time. In any event as ablation continues the thermocouple hot junction continues to reform and a substantially continuous record of hot junction temperature is obtained during ablation. In addition, at the end of the ablation period when the temperatures no longer exceed the melting point of the thermocouple hot junction, the wires remain welded and temperature measurements are made during cooling of the ablative structure.

In addition to providing cooling data after rewelding of the thermocouple hot junction it is found that the melting and rewelding occurring at the hot junction provides an accurate measure of the thermocouple output precisely at the melting point of the lower melting leg of the thermocouple. Thus each heating with the thermocouple subjected to melting at the end and rewelding of the hot junction, provides a specific voltage output (about 41.5 to 42.5 millivolts) at 5,648° F., which is the melting point of the tungsten-26% rhenium leg of the thermocouple. This specific voltage output at a well known temperature provides a valuable point for in-service calibration of the thermocouple, and outputs below the melting point are readily adjusted, if necessary, on the basis of the relation of thermocouple output at the known temperature to the expected output. It has been conventional practice to certify thermocouple output before use up to about 2500° F. and it has been necessary to extrapolate to more elevated temperatures which may lead to substantial temperature errors. By providing a thermocouple that melts and reforms the hot junction according to principles of this invention, an accurate calibration point is obtained at elevated temperature for internal calibration of the thermocouple during actual use thereof.

In order to obtain satisfactory melting and rewelding of the thermocouple wires to give a high temperature calibration point and also cooling data, certain critical dimensions have been found. Thus, it is found that the diameter of the two wires forming the two legs of the thermocouple junction should be in the range of from about 0.005 inch to about 0.020 inch diameter. When wires smaller than about 0.005 inch are employed it is found that they are too weak and have insufficient mass to reliably form rewelded hot junctions even in relatively low aerodynamic shear environments. It is found in very high shear environments that a wire diameter up to about 0.020 inch can be employed although it is particularly preferred that the wire diameter not exceed about 0.010 inch since the greatly increased mass of larger diameter wires noticeably increases the time constant of the thermocouple.

A particularly critical dimension is the thickness or width of the web 28 between the two thermocouple wires, that is the space between the wires. It is found that this web thickness should be in the range of from about 0.002 to about 0.005 inch. When thinner webs are employed the risk of short circuiting between the thermocouple wires is greatly enhanced and the shunt resistance between the two wires at elevated temperatures becomes a substantial factor in the accuracy of the temperature measurements obtained. When the web thickness or wire spacing is greater than about 0.005 inch it is found that rewelding of the thermocouple hot junction becomes quite unreliable and often does not occur at all.

It is also significant that the thickness of the sheath surrounding the thermocouple wires be quite low so that erosion thereof readily occurs and the end of the sheath is substantially flush with the ablating surface. It is therefore critical that the sheath thickness be in the range of from about 0.001 to about 0.005 inch. When thinner sheaths than about 0.001 inch are employed they are fragile for practical application and when sheaths greater than about 0.005 inch are employed they have so much heat capacity that melting is delayed and the thermocouple sheath protrudes a substantial distance from the ablating surface thereby minimizing erosion of the contained beryllium oxide and substantially inhibiting rewelding of the thermocouple hot junction. It is also significant that the sheath have a melting temperature appreciably below the melting temperature of the thermocouple wires. Although it does not appear to be so critical as the other dimensions it is preferred that the external diameter of the sheath surrounding the thermocouple wires be in the range of about $\frac{1}{32}$ to $\frac{1}{8}$ inch diameter.

In order to make a thermocouple as described and illustrated, a small diameter tantalum tube is prepared with one end welded shut. A pair of dissimilar thermocouple wires are assembled with a plurality of beads or short tubes of loosely fritted beryllium oxide having a cross-section substantially as illustrated in FIG. 3 strung thereon. The ends of the two thermocouple wires are placed in a tantalum plug and preferably lightly peened into place for ease in assembly. The assembly of tantalum plug, thermocouple wires, and beryllium oxide beads is then inserted in the tantalum tube clear to the welded end thereof. The tantalum tube is then swaged to a smaller diameter, thereby crushing and compacting the beryllium oxide tightly around the two thermocouple wires. After swaging to the desired diameter the thermocouple sheath with its contained wires and insulation is bent at a right angle around a reasonably small radius in order to provide a thermocouple having a shape as illustrated in FIG. 2.

As pointed out hereinabove it is preferred that the sheath of the thermocouple assembly have a very thin wall for minimum time constant. In order to produce such a thin wall it is preferred to chemically etch the tantalum sheath after swaging for reducing the wall thickness thereof. The chemical etching is preferred over additional swaging since swaging introduces undesirable cold work into both the sheath and the wires and this is avoided by chemical etching. Chemical etching also gives accurate thickness control on the sheath. In addition, the chemical etching operation can be conducted on the thermocouple after the end is bent as illustrated in FIG. 2. If it is attempted to bend the thermocouple after reducing the wall thickness it is usually found that buckling and destruction of the thermocouple occurs.

In order to chemically etch a tantalum sheathed thermocouple it is preferred to employ an aqueous etchant made by mixing from 50 to 75 volume percent of 48% hydrofluoric acid with from 25 to 50 volume percent of 70% nitric acid. The thermocouple is dipped into the etchant at about 115° to 125° F. for a time sufficient to remove the desired thickness of material.

It is found in application of the principles of this invention to somewhat lower temperature environments that other thermocouple materials can be employed. Thus, for example, platinum and platinum-rhodium alloys of the conventional types can be employed as well as the conventional Chromel and Alumel combination. In both of these combinations good rewelding of hot junctions is obtained when the surrounding sheath erodes at substantially the same rate as the surface. For these lower temperature thermocouple materials the sheath is preferably formed of Inconel, an austenitic stainless steel, or the like; and for the platinum thermocouple a platinum-rhodium alloy sheath can also be employed. Suitable insulating ceramics within the sheath and between the thermocouple wires include magnesium oxide, aluminum oxide, and zirconium oxide.

With the preferred tungsten-tungsten rhenium thermocouples certain substitutions can be made in the sheath material such as, for example, tungsten rhenium or molybdenum-rhenium alloys, molybdenum coated with molybdenum disilicide or columbium. By the same token, the beryllium oxide can be replaced with hafnium oxide, thorium oxide, or zirconium diboride. The materials in the preferred embodiment described and illustrated are particularly preferred since the tantalum has a satisfactory melting point, good ductility and strength at the elevated temperatures to which the thermocouple is subjected; beryllium oxide is the preferred insulator since high quality, high purity beryllium oxide in two hole crushable beads is readily available and the beryllium oxide has high electrical resistivity and electric breakdown strength at temperatures up to at least 5,000° F. The tungsten-tungsten rhenium alloys are preferred conductors since these have high thermoelectric output, high and well known melting point, and good erosion resistance.

It will also be apparent that instead of using two thermocouple wires having a hot junction grounded to the sheath, the hot junction can be electrically isolated. Similarly, instead of using two wires in a sheath, a single wire can be employed in a sheath made of a material forming a good thermoelectric pair therewith. Thus, for example, a platinum wire in a sheath of platinum-10% rhodium alloy forms a good thermocouple and if the space between the sheath and the internal wire is less than about 0.005 inch good rewelding is obtained in an erosive environment.

What is claimed is:
1. A high temperature thermocouple comprising:
   a first thermocouple conductor;
   a second thermocouple conductor compositionally dissimilar from said first conductor for generating a thermoelectric output signal, said first and second conductor being electrically interconnected at one end to form a hot junction;
   a supporting structure circumjacent said first and second conductors, having an erosion rate greater than the erosion rate of said conductors.
2. A high temperature thermocouple as defined in claim 1 wherein said first and second conductors are each wires, and said supporting structure comprises:
   a thin walled metal sheath around said wires; and
   compacted insulating powder in said sheath for insulating said wires from each other and from said sheath;
   said metal sheath having a wall only sufficiently thick to erode at said greater erosion rate.
3. A high temperature thermocouple as defined in claim 1 wherein said first and second conductors are closely spaced apart by a distance sufficient for molten material from the lower melting of said conductors to contact the higher melting of said conductors for providing a thermoelectric output at the melting point of said lower melting conductor.

4. A high temperature thermocouple comprising:
   a first thermocouple wire;
   a second thermocouple wire compositionally dissimilar from said first wire for generating a thermoelectric output signal, said first and second wires being electrically interconnected at one end to form a hot junction;
   electrical insulation between said first and second wires, said wires being spaced apart no more than about 0.005 inch by said insulation;
   an enclosing sheath circumjacent said wires, said sheath having an erosion rate greater than the erosion rate of said wires.
5. A high temperature thermocouple as defined in claim 4 wherein said first and second wires each have a diameter in the range of from about 0.005 to 0.020 inch.
6. A high temperature thermocouple as defined in claim 4 wherein:
   said first wire comprises an alloy of tungsten with about five percent rhenium;
   said second wire comprises an alloy of tungsten with about twenty-six percent rhenium; and
   said electrical insulation comprises compacted beryllium oxide powder.
7. A high temperature thermocouple as defined in claim 6 wherein said sheath comprises a tube of tantalum having a wall thickness in the range of about 0.001 to 0.005 inch.
8. A high temperature thermocouple as defined in claim 4 wherein:
   said first wire comprises an alloy of tungsten with about five percent rhenium and has a diameter of about 0.005 inch;
   said second wire comprises an alloy of tungsten with about twenty-six percent rhenium, has a diameter of about 0.005 inch, and is spaced apart from said first wire about 0.004 inch;
   said electrical insulation comprises compacted beryllium oxide powder, and beryllium oxide powder also surrounds said wires; and
   said sheath contains said beryllium oxide powder and comprises a tantalum tube having a wall thickness of about 0.002 inch for at least a portion of its length.
9. A high temperature thermocouple as defined in claim 4 wherein the thermocouple includes an end portion including the hot junction formed at a right angle to the body-portion of the thermocouple, the bent end-portion being adapted to be parallel to a heat-receiving surface.
10. The combination of claim 9 including an ablative body having a surface upon which high heat flux is expected to impinge, the angled end portion including the hot junction of said thermocouples being substantially parallel to said surface.

References Cited

UNITED STATES PATENTS

| | | | |
|---|---|---|---|
| 2,987,565 | 6/1961 | Barnhart et al. | 136—233 |
| 3,016,412 | 1/1962 | Ross | 136—233X |
| 3,278,341 | 10/1966 | Gee | 136—233 |
| 3,329,534 | 7/1967 | Adler et al. | 136—233 |
| 3,395,051 | 7/1968 | Pisarz | 136—233 |

CARL D. QUARFORTH, Primary Examiner

S. J. LECHERT, JR., Assistant Examiner

U.S. Cl. X.R.
136—236, 237